United States Patent
Xu et al.

(10) Patent No.: US 12,395,308 B2
(45) Date of Patent: Aug. 19, 2025

(54) NETWORK AND NODE SYNCHRONIZATION METHOD

(71) Applicant: REALTEK SEMICONDUCTOR CORP., Hsinchu (TW)

(72) Inventors: Xiao-Dan Xu, Suzhou (CN); Li-Bin Yang, Suzhou (CN); Ping Yan, Suzhou (CN); Jun-Mei Xu, Suzhou (CN); Xu-Liang Shen, Suzhou (CN); Si-Yuan Wang, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 544 days.

(21) Appl. No.: 17/842,884

(22) Filed: Jun. 17, 2022

(65) Prior Publication Data
US 2023/0179393 A1  Jun. 8, 2023

(30) Foreign Application Priority Data
Dec. 7, 2021 (CN) .......................... 202111513978.4

(51) Int. Cl.
*H04L 7/00* (2006.01)
*H04L 7/04* (2006.01)

(52) U.S. Cl.
CPC .......... *H04L 7/0016* (2013.01); *H04L 7/0008* (2013.01); *H04L 7/041* (2013.01)

(58) Field of Classification Search
CPC .. H04B 7/2662; H04B 7/2671; H04B 7/2681; H04J 1/065; H04J 3/06; H04J 3/0635; H04J 3/0685; H04J 3/0697; H04J 2011/0096; H04J 2013/0096; H04L 7/0008; H04L 7/0016; H04L 7/04; H04L 7/041; H04L 7/042; H04L 7/08; H04L 27/2655; H04L 27/2662; H04L 27/2675; H04W 4/80; H04W 56/001; H04W 56/0015; H04W 56/002; H04W 84/18; H04W 84/20; H04W 84/22; Y02D 30/70
See application file for complete search history.

(56) References Cited

U.S. PATENT DOCUMENTS

| | | | | |
|---|---|---|---|---|
| 6,069,887 A | * | 5/2000 | Geiger | H04J 3/0664 370/349 |
| 8,279,897 B2 | * | 10/2012 | Lee | H04J 3/06 370/503 |
| 9,516,595 B2 | * | 12/2016 | Abraham | H04W 56/002 |
| 9,585,113 B2 | * | 2/2017 | Nomura | H04W 56/002 |

(Continued)

FOREIGN PATENT DOCUMENTS

| CN | 105515750 A | 4/2016 |
|---|---|---|
| CN | 111542038 A | 8/2020 |

*Primary Examiner* — Frank Duong (57) ABSTRACT

A node synchronization method, includes: receiving a synchronization message by a first synchronization node in a network; determining whether to update a first local time of the first synchronization node according to the synchronization message by the first synchronization node; updating the first local time according to a synchronization time of the synchronization message by the first synchronization node when determining to update the first local time; and updating the synchronization time of the received synchronization message with the current first local time and forwarding the updated synchronization message by the first synchronization node.

20 Claims, 7 Drawing Sheets

(56) References Cited

U.S. PATENT DOCUMENTS

| 9,826,491 | B2* | 11/2017 | Aaltonen | H04W 56/00 |
| 2009/0228732 | A1* | 9/2009 | Budde | H04L 12/403 |
| | | | | 713/400 |
| 2009/0290572 | A1* | 11/2009 | Gonia | H04J 3/0641 |
| | | | | 370/350 |

* cited by examiner

NETWORK AND NODE SYNCHRONIZATION METHOD

CROSS-REFERENCE TO RELATED APPLICATION

This non-provisional application claims priority under 35 U.S.C. § 119 (a) to patent application No. 202111513978.4 filed in China, P.R.C. on Dec. 7, 2021, the entire contents of which are hereby incorporated by reference.

BACKGROUND

Technical Field

The present application relates to a time synchronization technology between multiple nodes in a network, and in particular, relates to a network and a node synchronization method.

Related Art

More and more smart devices have joined the BLE (Bluetooth low energy) mesh for the BLE mesh has the advantages of wide coverage, high interoperability, and low power consumption.

Conventionally, there is no network-wide time synchronization mechanism in the traditional BLE mesh. Since each smart device in the BLE mesh may transmit a message at any time, thereby other smart devices must always be active to ensure that the message may be arriving at any time can be received. Therefore, the probability of message collision and the power consumption of smart devices increase with more smart devices in the BLE mesh.

SUMMARY

The present application provides a node synchronization method. In an embodiment, the node synchronization method includes: receiving a synchronization message by a first synchronization node in a network; determining whether to update a first local time of the first synchronization node according to the synchronization message by the first synchronization node; updating the first local time according to a synchronization time of the synchronization message by the first synchronization node when determining to update the first local time; and updating the synchronization time of the received synchronization message with the current first local time and forwarding the updated synchronization message by the first synchronization node.

The present application provides a network. In an embodiment, the network includes a first synchronization node. The first synchronization node has a first local time. The first synchronization node is configured to receive a synchronization message and determine whether to update the first local time when receiving the synchronization message. The synchronization message includes a synchronization time. When determining to update the first local time, the first synchronization node updates the first local time according to the synchronization time, and the first synchronization node updates the synchronization time of the received synchronization message with the current first local time and forwards the updated synchronization message.

In sum, in the network and node synchronization method of the embodiments of the present application, the first synchronization node can determine whether to update the first local time according to the synchronization message. After updating the first local time according to the synchronization time of the synchronization message, the first synchronization node then updates the synchronization time of the received synchronization message with the current first local time and forwards the updated synchronization message. In this way, all the synchronization nodes in this network can achieve time synchronization. After the time synchronization is achieved, each synchronization node in the network can control the timing of message transmission to reduce the probability of message collision. Furthermore, more synchronization nodes can enter a low-power mode when they have no message to transmit or receive to reduce their power consumption. Moreover, it can multiplex the channel with other wireless communication technologies in time slots, such that different wireless network communication technologies can coexist.

Detailed features and advantages of the present application are described in detail in the following implementations, and the content of the implementations is sufficient for a person skilled in the art to understand and implement the technical content of the present application. A person skilled in the art can easily understand the objectives and advantages related to the present application according to the contents disclosed in this specification, the claims and the drawings.

BRIEF DESCRIPTION OF THE DRAWINGS

The disclosure will become more fully understood from the detailed description given herein below for illustration only, and thus not limitative of the disclosure, wherein.

DETAILED DESCRIPTION

In order to make the above objects, features and advantages of the embodiments of the present application easier to understand, a detailed description is given in the following embodiments with reference to the accompanying drawings.

Figure 1:
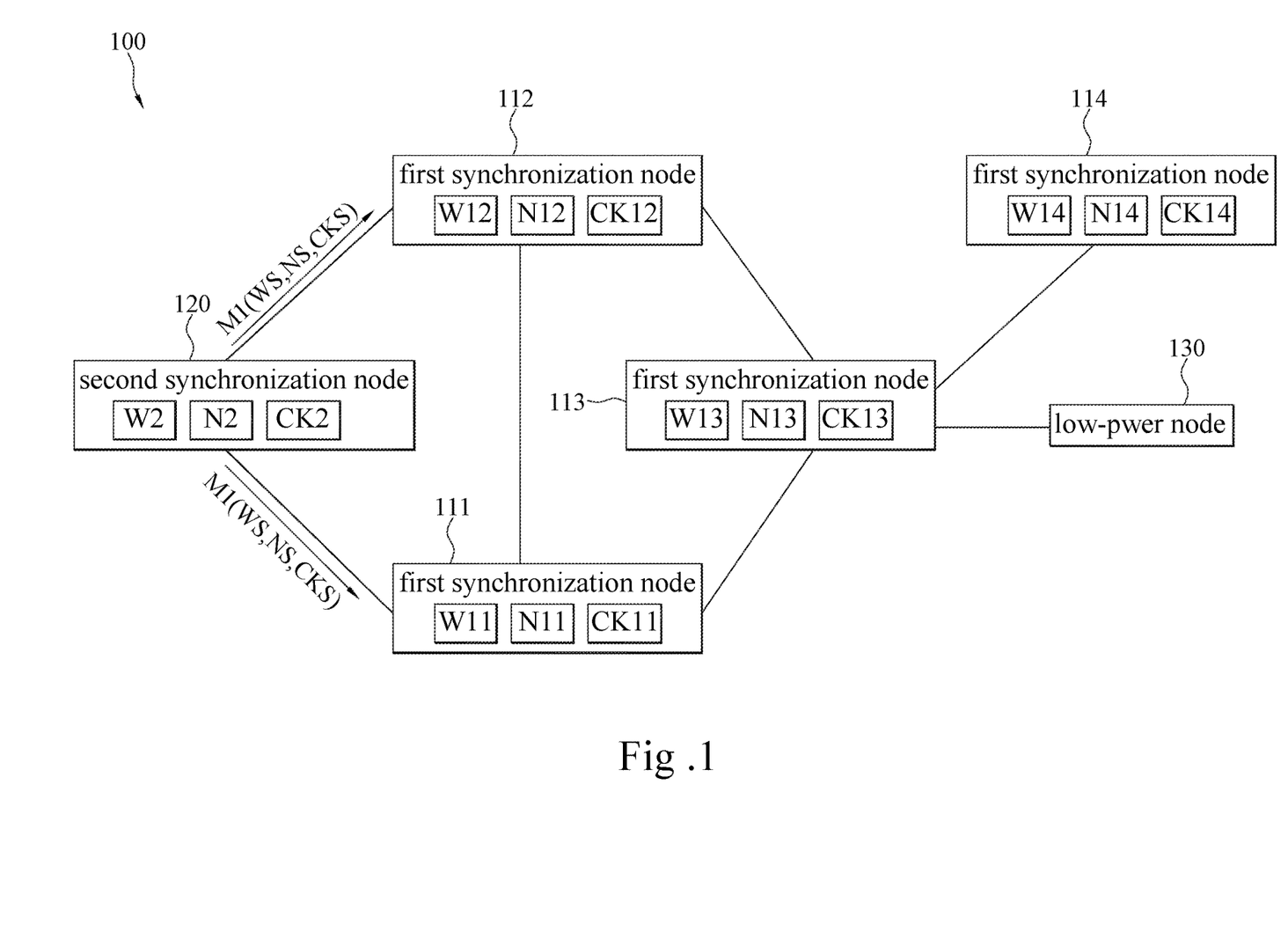
FIG. 1 illustrates a schematic diagram of an embodiment of a network.

FIG. 1 illustrates a schematic diagram of an embodiment of a network 100. Please refer to FIG. 1. The network 100 can include at least one synchronization node (hereinafter referred to as a first synchronization node). Hereinafter, four first synchronization nodes 111-114 are taken as an example for description, but the number is not limited thereto. Furthermore, the network 100 can further include a synchronization node (hereinafter referred to as a second synchronization node 120) as an initiated synchronization node. The initiated synchronization node refers to a synchronization node in the network 100 that will actively generate and broadcast a synchronization message M1.

In some embodiments, each of the first synchronization nodes 111-114 may be a common node or a friend node. If it is a friend node, it will correspond to a low-power node. For example, the first synchronization nodes 111, 112, and 114 may be common nodes, the first synchronization node 113 may be a friend node, and the first synchronization node 113 could correspond to a low-power node 130.

In some implementation, the network 100 may be a BLE (Bluetooth low energy) mesh network constructed by the first synchronization nodes 111-114, the second synchronization node 120, and the low-power node 130 through Bluetooth transmission technology. In other words, the first synchronization nodes 111-114, the second synchronization node 120, and the low-power node 130 can separately be electronic devices with a Bluetooth module.

In some embodiments, the second synchronization node 120 is a provisioner in the network 100. Each of the first synchronization nodes 111-114 and the low-power node 130 at the time that first joins the network 100 need to be provisioned by the second synchronization node 120. In the provision, each of the first synchronization nodes 111-114 and the low-power node 130 may be assigned an IP (Internet Protocol) address and a key for establishing a secure transmission channel. In some implementations, each of the IP addresses assigned to the first synchronization nodes 111-114 and the low-power node 130 may be a unicast address. Furthermore, the unicast address of each of the first synchronization nodes 111-114 and the low-power node 130 may be ranged from 0x0001 to 0x7FFF. For example, the unicast address of the first synchronization node 111 may be 0x0005, the unicast address of the first synchronization node 112 may be 0x0004, the unicast address of the first synchronization node 113 may be 0x0001, the unicast address of the first synchronization node 114 may be 0x0003, and the unicast address of the low-power node 130 may be 0x0002.

In some embodiments, each of the first synchronization nodes 111-114 can have a first local time CK11-CK14, and the second synchronization node 120 has a second local time CK2. In some implementations, each of the first synchronization nodes 111-114 can generate the first local time CK11-CK14 through its internal oscillator, but the present application is not limited thereto. Similarly, the second synchronization node 120 can also obtain a second local time CK2 through its internal oscillator.

In some embodiments, each of the first synchronization nodes 111-114 can store a first local weight W11-W14 and a first local number N11-N14. Furthermore, the second synchronization node 120 can store a second local weight W2 and a second local number N2. In some implementations, each of the first synchronization nodes 111-114 and the second synchronization node 120 can store through but not limited to a RAM (random access memory), a cache memory, etc.

In some embodiments, the first local numbers N11-N14 and the second local number may all be an initial value, such as zero, in the initial state. Furthermore, the second local weight W2 may be greater than the first local weight W11-W14 of each of the first synchronization nodes 111-114. In some implementations, the first local weight W11-W14 of each of the first synchronization nodes 111-114 can be its unicast address, and the second local weight W2 of the second synchronization node 120 is 0xFFFF.

Figure 2:
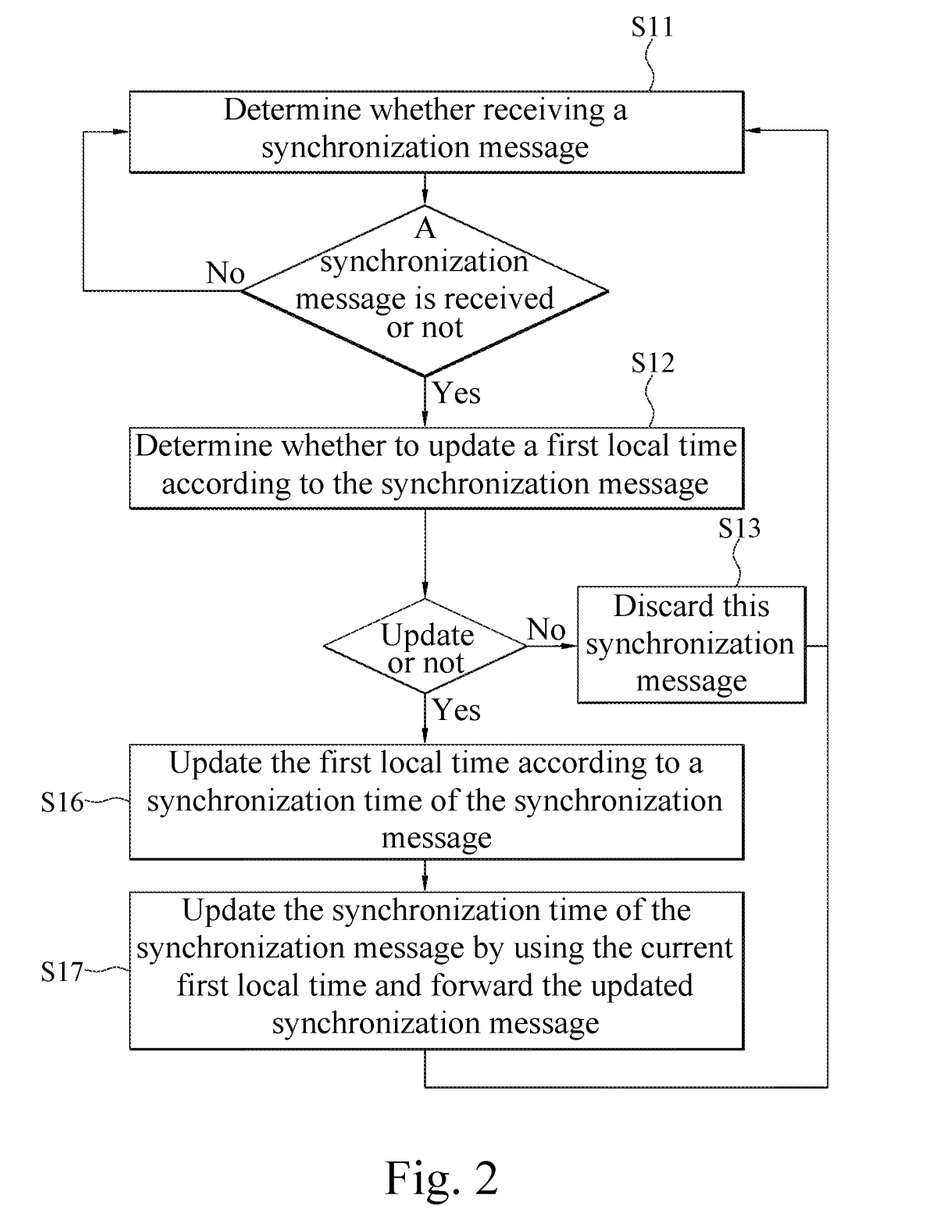
FIG. 2 illustrates a schematic flowchart of an embodiment of a node synchronization method.

FIG. 2 illustrates a schematic flowchart of an embodiment of a node synchronization method. Please refer to FIG. 1 and FIG. 2. The network 100 of an embodiment of the present application can perform any embodiment of the node synchronization method, such that all the nodes in the network 100 can maintain time synchronization. Hereinafter, the first synchronization node 111 is taken as an example for description, and the operations of the other first synchronization nodes 112-114 can roughly refer to the description of the first synchronization node 111. In an embodiment of the node synchronization method, the first synchronization node 111 in the network 100 can first determine whether receiving a synchronization message M1 (step S11). After determining a synchronization message M1 is received, the first synchronization node 111 can determine whether to update its first local time CK11 according to the synchronization message M1 (step S12). Wherein, the synchronization message M1 includes a synchronization weight WS, a synchronization number NS, and a synchronization time CKS.

When determining not to update the first local time CK11, the first synchronization node 111 can discard this synchronization message M1 (step S13). When determining to update the first local time CK11, the first synchronization node 111 can update the first local time CK11 according to the synchronization time CKS of the synchronization message M1 (step S16). For example, the first synchronization node 111 can directly replace the value of the first local time CK11 with the value of the synchronization time CKS. However, the present application is not limited to this. The first synchronization node 111 can also update the value of the first local time CK11 by adding the value of the synchronization time CKS with an estimated consumption time of sending a message, transmission in the air and receiving a message.

Furthermore, in step S16, the first synchronization node 111 can further respectively update the first local weight W11 and the first local number N11 according to the synchronization weight WS and the synchronization number NS of the synchronization message M1. For example, the first synchronization node 111 can directly replace the first local weight W11 with the synchronization weight WS and replace the first local number N11 with the synchronization number NS.

After finishing the updating of the first local time CK11, the first synchronization node 111 can update the synchronization time CKS of the received synchronization message M1 with its current first local time CK11, and then forward the updated synchronization message M1 to other first synchronization nodes within its forwarding range (step S17). For example, forward it to the first synchronization nodes 112 and 113. In an embodiment of step S17, the first synchronization node 111 replaces the value of the synchronization time CKS of the received synchronization message M1 with the value of its current first local time CK11.

In this way, each of the first synchronization nodes 111-114 in the network 100 can achieve time synchronization with each other after performing any embodiment of the node synchronization method of the present application.

Figure 3:
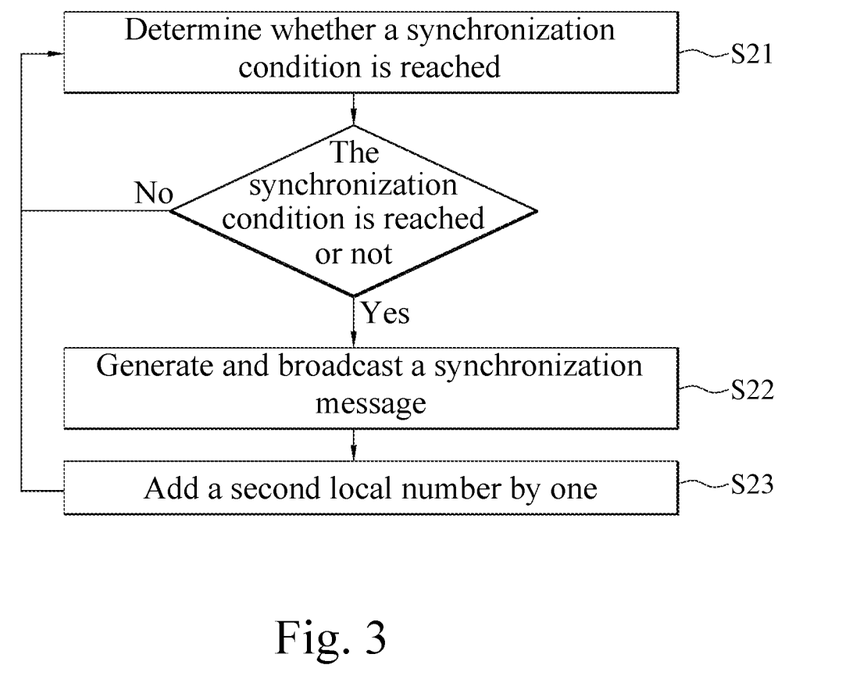
FIG. 3 illustrates a schematic flowchart of an embodiment of broadcasting a synchronization message by a second synchronization node.

FIG. 3 illustrates a schematic flowchart of an embodiment of broadcasting a synchronization message by a second synchronization node. Please refer from FIG. 1 to FIG. 3. In some embodiments, the synchronization message M1 can be broadcast by the second synchronization node 120 when a synchronization condition is reached. In an embodiment, the second synchronization node 120 can first determine whether the synchronization condition is reached (step S21). When determining that the synchronization condition is reached, the second synchronization node 120 generates a synchronization message M1 and broadcasts the synchronization message M1 (step S22). In some embodiments, the synchronization condition can be every time a predetermined synchronization period is reached or an unsynchronized node joins the network 100. In other words, the second synchronization node 120 may periodically generate and broadcast the synchronization message M1. Herein, the predetermined synchronization period may be 20 minutes, but the value is not limited thereto.

In some embodiments, the synchronization message M1 includes a synchronization weight WS, a synchronization number NS, and a synchronization time CKS. When generating a synchronization message M1 in step S22, the second synchronization node 120 can fill the synchronization weight WS of the synchronization message M1 with its second local weight W2, fill the synchronization number NS of the synchronization message M1 with its second local number N2, and fill the synchronization time CKS of the synchronization message M1 with its second local time CK2. In other words, in the synchronization message M1 broadcasted by the second synchronization node 120, the synchronization time CKS is the second local time CK2 that the second synchronization node 120 generates this synchronization message M1. In this way, each of the first synchronization nodes 111-114 in the network 100 can achieve time synchronization with the second synchronization node 120 after performing any embodiment of the node synchronization method of the present application, thereby achieving network-wide time synchronization.

In some implementations, the synchronization message M1 can be an advertising package (advertising data) with a custom part. Wherein, the synchronization weight WS may occupy 2 bytes, the synchronization number NS may occupy 2 bytes, and the synchronization time CKS may occupy 4 bytes. Furthermore, the TTL (time to live) of the synchronization message M1 can always be one.

In some embodiments, after generating the synchronization message M1, the second synchronization node 120 can increase its second local number N2 by one (step S23). In other words, the second local number N2 will increase with the times that the second synchronization node 120 generates a synchronization message M1.

Figure 4:
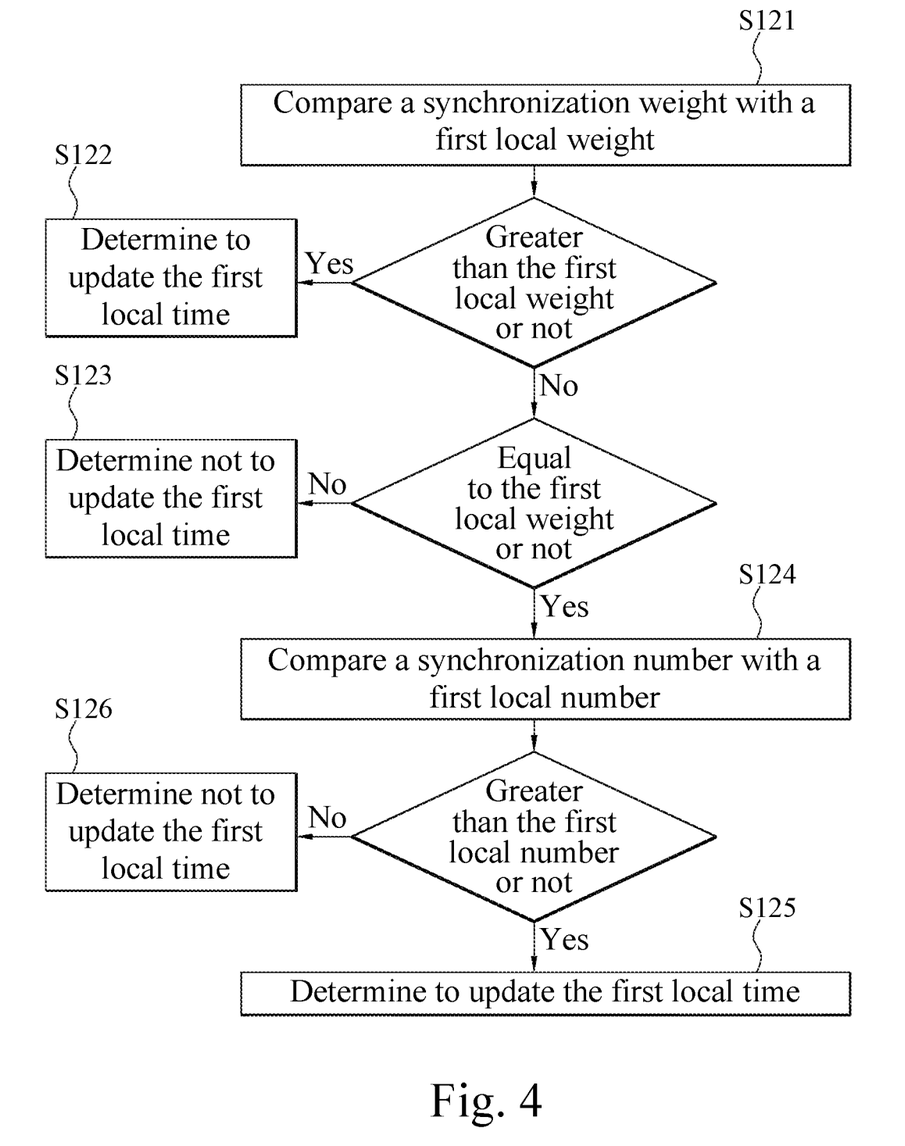
FIG. 4 illustrates a schematic flowchart of an embodiment of step S12.

FIG. 4 illustrates a schematic flowchart of an embodiment of step S12. Please refer from FIG. 1 to FIG. 4. In an embodiment of step S12, the first synchronization node 111 can determine whether to update the first local time CK11 according to the synchronization weight WS of the synchronization message M1 and its first local weight W11. In some embodiments, the first synchronization node 111 can compare the synchronization weight WS with the first local weight W11 (step S121). When the synchronization weight WS is greater than the first local weight W11, the first synchronization node 111 determines to update the first local time CK11 (step S122), and the first synchronization node 111 can continue to perform the aforementioned steps S16 and S17. For example, it is assumed that the first local weight W11 currently stored by the first synchronization node 111 is 0x0005 and the synchronization weight WS of the received synchronization message M1 is 0xFFFF, the first synchronization node 111 will determine to update the first local time CK11. When the synchronization weight WS is smaller than the first local weight W11, the first synchronization node 111 determines not to update the first local time CK11 (step S123) and continues to perform step S13 to discard this synchronization message M1. For example, it is assumed that the first local weight W11 currently stored by the first synchronization node 111 is 0x0005 and the synchronization weight WS of the received synchronization message M1 is 0x0001, the first synchronization node 111 will determine not to update the first local time CK11. Wherein, this synchronization message M1 can be broadcasted by a first synchronization node whose unicast address is 0x0001, such as the first synchronization node 113, during electing the initiated synchronization node (the details of the election of initiated synchronization node will be described later).

In an embodiment of step S12, when the determination result of step S121 is that the synchronization weight WS is equal to the first local weight W11, the first synchronization node 111 can compare the synchronization number NS of the synchronization message M1 with the first local number N11 (step S124). When the synchronization number NS is greater than the first local number N11, the first synchronization node 111 determines to update the first local time CK11 (step S125), and the first synchronization node 111 can continue to perform the aforementioned steps S16 and S17. For example, it is assumed that the first synchronization node 111 has updated the first local weight W11 to 0xFFFF and updated the first local number N11 to zero according to the previous synchronization message M1. Furthermore, assuming that the synchronization weight WS of the synchronization message M1 currently received by the first synchronization node 111 is 0xFFFF and the synchronization number NS is one (it is represented that this is the synchronization message M1 broadcasted by the second synchronization node 120 for the second time), the first synchronization node 111 will further compare the synchronization number NS with the first local number N11 for the reason that the synchronization weight WS is equal to the first local weight W11, and the first synchronization node 111 will determine to update the first local time CK11 for the reason that the synchronization number NS is greater than the first local number N11 (a larger synchronization number NS represents that this synchronization message M1 is a new one).

When the synchronization number NS is smaller than or equal to the first local number N11, the first synchronization node 111 determines not to update the first local time CK11 (step S126), and the first synchronization node 111 can continue to perform step S13 to discard this synchronization message M1. In this case, a smaller synchronization number NS represents that this synchronization message M1 is an old one, and a synchronization number NS equal to the first local number N11 represents that the first synchronization node 111 has been updated before.

Figure 5:
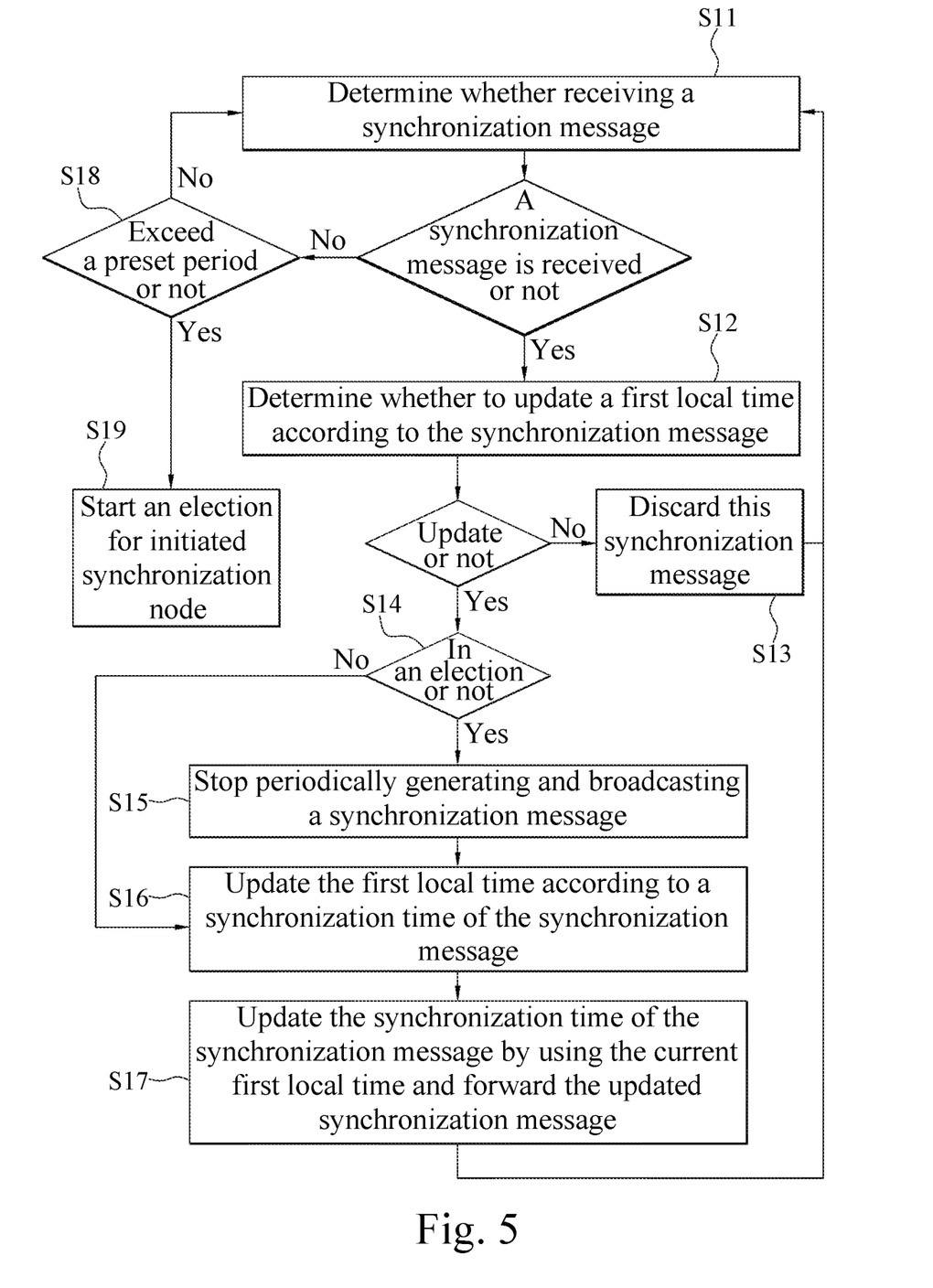
FIG. 5 illustrates a schematic flowchart of an embodiment of a node synchronization method.

FIG. 5 illustrates a schematic flowchart of an embodiment of a node synchronization method. Please refer from FIG. 1 to FIG. 5. In an embodiment of the node synchronization method, after determining in step S11 that does not receive a synchronization message M1, the first synchronization node 111 can further determine whether the time of not receiving the synchronization message M1 has exceeded a preset period (step S18). In some implementations, the preset period may be N predetermined synchronization periods. Wherein, N is greater than or equal to one. For example, one predetermined synchronization period may be 20 minutes, and the preset period may be three predetermined synchronization periods, i.e., 60 minutes.

When the first synchronization node 111 determines that not received a synchronization message M1 for more than the preset period, the first synchronization node 111 determines that the current initiated synchronization node has failed and needs to start an election for initiated synchronization node (step S19). At this time, the first synchronization node 111 will start to periodically generate a synchronization message M1 and periodically broadcast the synchronization message M1.

In an embodiment of step S19, after determining to start the election for initiated synchronization node, the first synchronization node 111 can first initialize its first local weight W11, and initialize its first local number N11. After that, the first synchronization node 111 can generate a synchronization message M1 according to the current first local time CK11, the initialized first local weight W11 (e.g., its unicast address), and the initialized first local number N11 (e.g., zero) and broadcast this synchronization message M1. Wherein, the synchronization time CKS of the synchronization message M1 is the current first local time CK11, the synchronization weight WS of the synchronization message M1 is the initialized first local weight W11, and the synchronization number NS of the synchronization message M1 is the initialized first local number N11.

In an embodiment of the node synchronization method, when the determination result of the first synchronization node 111 in step S12 is to update the first local time CK11, the first synchronization node 111 can first determine whether it is in the election of the initiated synchronization node (step S14). Wherein, when the first synchronization node 111 is actively and periodically generating and broadcasting a synchronization message M1, it represents that the first synchronization node 111 is in the election of the initiated synchronization node. At this time, the first synchronization node 111 will determine that its election has failed, and stop periodically generating and broadcasting a synchronization message as M1 (step S15). After that, the first synchronization node 111 will continue to perform step S16 to update its first local time CK11, first local weight W11, and first local number N11 according to the received synchronization message M1. On the contrary, when the first synchronization node 111 is not actively and periodically generating and broadcasting a synchronization message M1, it represents that the first synchronization node 111 is not in the election of the initiated synchronization node. At this time, the first synchronization node 111 can directly continue to perform step S16 to update its first local time CK11, first local weight W11, and first local number N11 according to the received synchronization message M1.

Figure 7:
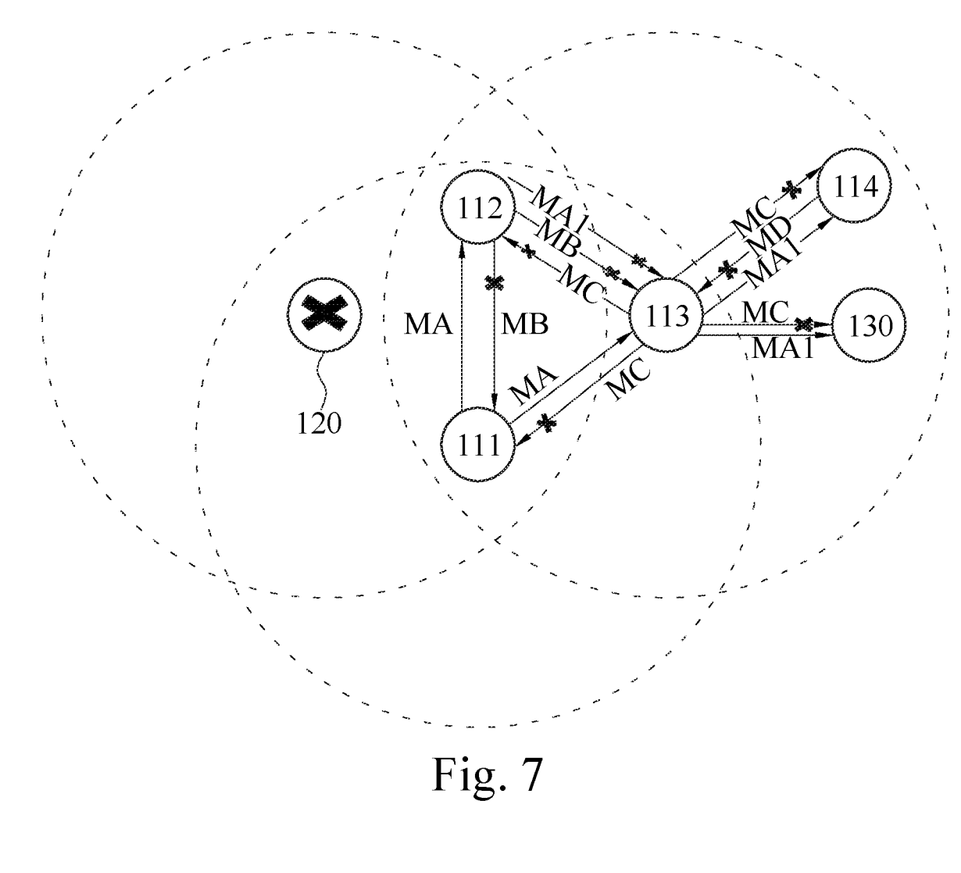
FIG. 7 illustrates a schematic diagram of an example of electing an initiated synchronization node in a network.

In some embodiments, when the second synchronization node 120 returns to the normal state after a failure, it can actively broadcast a synchronization message M1 again to regain the qualification as the initiated synchronization node in the network 100. For example, under a condition that after the second synchronization node 120 failed and the first synchronization node 111 has become a new initiated synchronization node and periodically generates and broadcasts a synchronization message MA according to its first local time CK11, first local weight W11, and first local number N11 (as shown in FIG. 7), the second synchronization node 120 can actively generate and broadcast a synchronization message M1 according to its second local time CK2, second local weight W2, and second local number N2 when returning to the normal state, such that the first synchronization node 111 will stop broadcasting the synchronization message MA after receiving the synchronization message M1. In this way, the second synchronization node 120 can regain the qualification as the initiated synchronization node in the network 100 and continues to periodically generate and broadcast a synchronization message M1.

In some embodiments, after the low-power node 130 exits from a low-power mode, the first synchronization node 113 as a friend node can generate a synchronization message M1 according to its current first local time CK13 and forward this synchronization message M1 to the low-power node 130, such that the low-power node 130 can update its local time according to the synchronization message M1. For example, the low-power node 130 can enter an active mode after exiting from the low-power mode, and send a query signal to the first synchronization node 113. When receiving the query signal from the low-power node 130, the first synchronization node 113 can generate and transmit a synchronization message M1 to the low-power node 130 according to its current first local time CK13, the first local weight W13 and the first local number N13, such that the low-power node 130 updates its local time according to the synchronization time CKS of the synchronization message M1.

Figure 6:
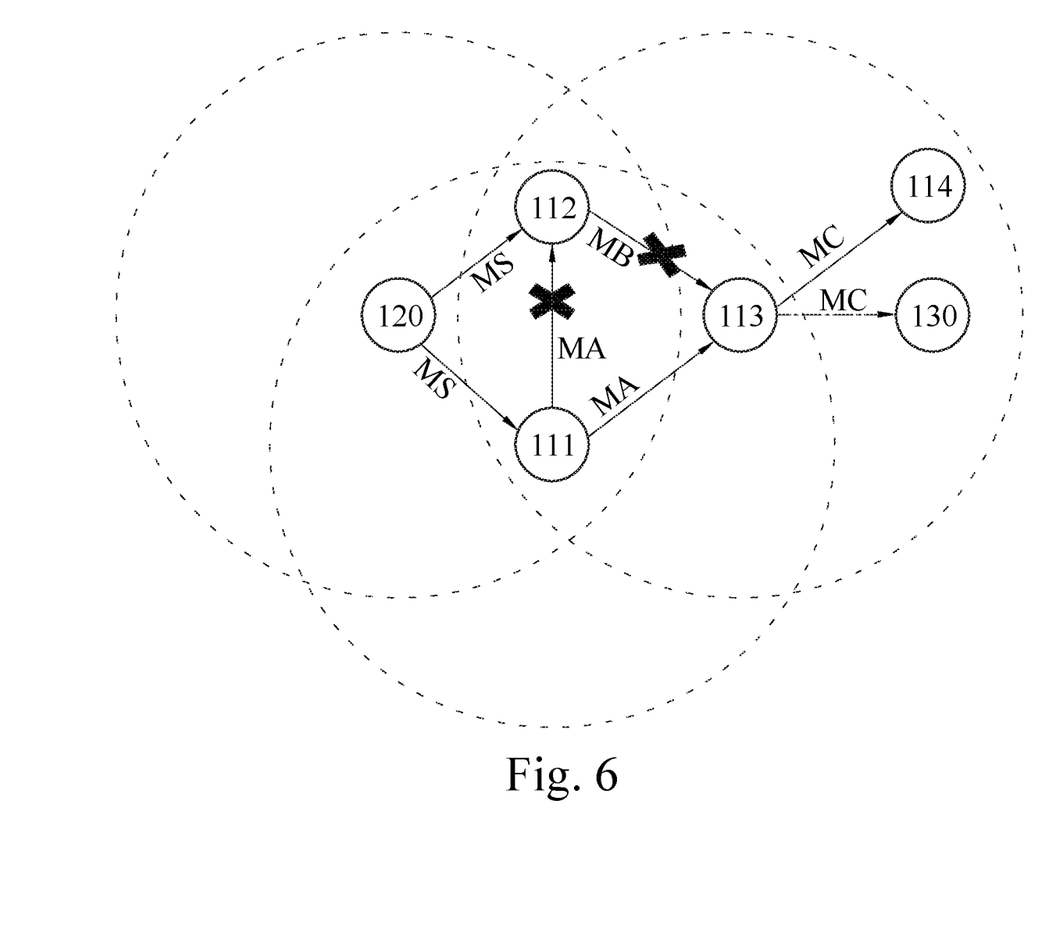
FIG. 6 illustrates a schematic diagram of an example of transmitting synchronization messages in a network.

FIG. 6 illustrates a schematic diagram of an example of transmitting synchronization messages in the network 100. It should be noted that, for simplicity, some synchronization messages are not shown to show the stage-by-stage forwarding of synchronization messages. Please refer from FIG. 1 to FIG. 6. In an example of the network 100, the second synchronization node 120 can broadcast a synchronization message MS to the first synchronization nodes 111 and 112 within its broadcast range. The synchronization nodes 111 and 112 will respectively determine whether to update their first local times CK11 and CK12 according to the synchronization weight WS of the synchronization message MS and their first local weights W11 and W12 after receiving the synchronization messages MS. Wherein, the synchronization weight WS of the synchronization message MS is the second local weight W2 of the second synchronization node 120, such as 0xFFFF, the first local weight W11 may be, for example, 0x0005, and the first local weight W12 may be, for example, 0x0004. Furthermore, the synchronization number NS and the first local numbers N11 and N12 can all be, for example, 1 at present.

Since the synchronization weights WS of the synchronization messages MS are greater than the first local weights W11 and W12, the first synchronization nodes 111 and 112 respectively update the first local times CK11 and CK12 according to the synchronization times CKS of the synchronization messages MS, respectively update the first local weights W11 and W12 according to the synchronization weights WS of the synchronization messages MS (i.e., the first local weights W11 and W12 stored by the first synchronization nodes 111 and 112 both become 0xFFFF), and respectively update the first local numbers N11 and N12 according to the synchronization numbers NS of the synchronization messages MS. After finishing the update, the first synchronization nodes 111 and 112 respectively replace the values of the synchronization times CKS of the synchronization messages MS with the values of their current first local times CK11 and CK12 to respectively generate the synchronization messages MA and MB, and respectively forward the synchronization messages MA and MB. Wherein, the first synchronization node 111 will forward the synchronization message MA to the second synchronization node 120 and the first synchronization nodes 112 and 113 within its forwarding range, and the first synchronization node 112 will forward the synchronization message MB to the second synchronization node 120 and the first synchronization nodes 111 and 113 within its forwarding range. Herein, the second synchronization node 120 will discard any received synchronization messages. Furthermore, the first synchronization node 112 will discard the synchronization message MA (because the synchronization weight WS of the synchronization message MA is equal to the current first local weight W12, and the synchronization number NS of the synchronization message MA is equal to the current first local number N12), and the first synchronization node 111 will discard the synchronization message MB (because the synchronization weight WS of the synchronization message MB is equal to the current first local weight W11, and the synchronization number NS of the synchronization message MB is equal to the current first local number N11).

The first local weight W13 of the first synchronization node 113 may be, for example, 0x0001, and the first synchronization node 113 can update its first local time CK13 according to one of the synchronization messages MA and MB and discard another one. Herein, it is assumed that the first synchronization node 113 first receives the synchronization message MA. Since the synchronization weight WS of the synchronization message MA is greater than the first local weight W13, the first synchronization node 113 can update its first local time CK13, first local weight W13 (becomes 0xFFFF after the update), and first local number N13 (becomes 1 after the update) according to the synchronization message MA. After finishing the update, the first synchronization node 113 replaces the value of the synchronization time CKS of the synchronization message MA with the value of its current first local time CK13 to generate a synchronization message MC, and forwards the synchronization message MC. After forwarding stage by stage according to this principle, all the synchronization nodes in the network 100 can achieve the time synchronization.

The low-power node 130 will not immediately receive the synchronization message MC forwarded by the first synchronization node 113. However, after the low-power node 130 exits from the low-power mode, the first synchronization node 113 will generate and forward a synchronization message MC to the low-power node 130 according to its current first local time CK13, such that the low-power node 130 can also keep time synchronization with other synchronization nodes.

FIG. 7 illustrates a schematic diagram of an example of electing an initiated synchronization node in a network. It should be noted that some synchronization messages are not shown to briefly illustrate the process of electing an initiated synchronization node. Please refer from FIG. 1 to FIG. 7. In an embodiment of electing an initiated synchronization node, each of the first synchronization nodes 111-114 can determine the current initiated synchronization node (i.e., the second synchronization node 120) has failed and start an election for the initiated synchronization node when not receiving a synchronization message for more than a preset time. First, each of the first synchronization nodes 111-114 initializes its first local weight W11-W14 and first local number N11-N14. For example, the initialized first local weights W11-W14 may be 0x0005, 0x0004, 0x0001 and 0x0003 in sequence, and the initialized first local numbers N11-N14 may all be zero. After that, each of the first synchronization nodes 111-114 periodically generates and broadcasts synchronization messages MA-MD according to their current first local time CK11-CK14, initialized first local weights W11-W14 and initialized first local number N11-N14, respectively.

After the first synchronization nodes 112 and 113 receive the synchronization message MA, the first synchronization nodes 112 and 113 can respectively determine to update (i.e., update the first local times CK12 and CK13, the first local weights W12 and W13, and the first local numbers N12 and N13) for the reason that the synchronization weight WS of the synchronization message MA is greater than the first local weights W12 and W13. Furthermore, the first synchronization nodes 112 and 113 respectively determine their election fail and stop actively broadcasting the synchronization messages MB and MC periodically. After finishing the update, the first synchronization nodes 112 and 113 can respectively update the synchronization times CKS of the received synchronization messages MA according to their first local times CK12 and CK13 to respectively generate synchronization messages MA1 and forward the synchronization messages MA1.

The first synchronization node 111 can receive the synchronization messages MB, MC, and MA1, but the first synchronization node 111 will discard the synchronization messages MB, MC, and MA1 (because the synchronization weights WS of the synchronization messages MB and MC are both smaller than the first local weight W11, and the synchronization weight WS and the synchronization number NS of the synchronization message MA1 are respectively equal to the first local weight W11 and the first local number N11). The first synchronization node 112 can receive the synchronization message MC, and the synchronization message MA1 forwarded by the first synchronization node 113, but the first synchronization node 112 will discard the synchronization messages MC and MA1 (because the synchronization weight WS of the synchronization message MC is smaller than the current first local weight W12, and the synchronization weight WS and the synchronization number NS of the synchronization message MA1 are respectively equal to the current first local weight W12 and the current first local number N12). The first synchronization node 113 can receive the synchronization messages MB and MD, and the synchronization message MA1 forwarded by the first synchronization node 112, but the first synchronization node 113 will discard the synchronization messages MB, MD, and MA1 (because the synchronization weights WS of the synchronization messages MB and MD are smaller than the current first local weight W13, and the synchronization weight WS and the synchronization number NS of the synchronization message MA1 are respectively equal to the current first local weight W13 and the current first local number N13). The first synchronization node 114 can receive the synchronization message MC, but the first synchronization node 114 will discard the synchronization message MC (because the synchronization weight WS of the synchronization message MC is smaller than the current first local weight W14). Furthermore, the first synchronization node 114 can receive the synchronization message MA1 forwarded by the first synchronization node 113. The first synchronization node 114 can determine to update (i.e., update the first local time CK14, the first local weight W14, and the first local number N14) for the reason that the synchronization weight WS of the synchronization message MA1 is greater than its first local weight W14, and determine its election fail and stop actively broadcasting the synchronization message MD periodically. After finishing the update, the first synchronization node 114 can update the synchronization time CKS of the received synchronization message MA1 according to its first local time CK14, and forward the synchronization message MA1. In this way, the first synchronization node 111 will become a new initiated synchronization node in this election for the initiated synchronization node and continue to periodically broadcast a synchronization message MA.

In sum, in the network and node synchronization method of the embodiments of the present application, the first synchronization node can determine whether to update the first local time according to the synchronization message. After updating the first local time according to the synchronization time of the synchronization message, the first synchronization node then updates the synchronization time of the received synchronization message with the current first local time and forwards the updated synchronization message. In this way, all the synchronization nodes in this network can achieve time synchronization. After the time synchronization is achieved, each synchronization node in the network can control the timing of message transmission to reduce the probability of message collision. Furthermore, more synchronization nodes can enter a low-power mode when they have no message to transmit or receive to reduce their power consumption. Moreover, it can multiplex the channel with other wireless communication technologies in time slots, such that different wireless network communication technologies can coexist.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A node synchronization method, comprising:
   receiving a synchronization message by a first synchronization node in a network;
   determining whether to update a first local time of the first synchronization node according to the synchronization message by the first synchronization node;
   updating the first local time according to a synchronization time of the synchronization message by the first synchronization node when determining to update the first local time; and
   updating the synchronization time of the received synchronization message with the current first local time and forwarding the updated synchronization message by the first synchronization node.

2. The node synchronization method of claim 1, further comprising:
   broadcasting the synchronization message by a second synchronization node in the network when a synchronization condition is reached.

3. The node synchronization method of claim 2, wherein the synchronization condition is that every time a predetermined synchronization period is reached or an unsynchronized node joins the network.

4. The node synchronization method of claim 2, wherein the synchronization time of the synchronization message is a second local time of the second synchronization node when generating the synchronization message, a synchronization weight of the synchronization message is a second local weight of the second synchronization node, and a synchronization number of the synchronization message is a second local number of the second synchronization node when generating the synchronization message; wherein the second local weight is greater than a first local weight of the first synchronization node; wherein the second local number is increased with the number of times that the second synchronization node generates the synchronization message; and wherein the step of determining whether to update the first local time of the first synchronization node according to the synchronization message by the first synchronization node is determining whether to update the first local time according to the synchronization weight of the synchronization message and the first local weight by the first synchronization node.

5. The node synchronization method of claim 1, wherein the step of determining whether to update the first local time of the first synchronization node according to the synchronization message by the first synchronization node comprises:
   comparing a synchronization weight of the synchronization message with a first local weight of the first synchronization node by the first synchronization node;
   determining to update the first local time by the first synchronization node when the synchronization weight is greater than the first local weight; and
   determining not to update the first local time by the first synchronization node when the synchronization weight is smaller than the first local weight.

6. The node synchronization method of claim 5, wherein step of determining whether to update the first local time of the first synchronization node according to the synchronization message by the first synchronization node further comprises:
   comparing a synchronization number of the synchronization message with a first local number of the first synchronization node by the first synchronization node when the synchronization weight is equal to the first local weight;
   determining to update the first local time by the first synchronization node when the synchronization number is greater than the first local number; and
   determining not to update the first local time by the first synchronization node when the synchronization number is smaller than or equal to the first local number.

7. The node synchronization method of claim 1, further comprising:
   respectively updating, by the first synchronization node, a first local weight and a first local number of the first synchronization node according to a synchronization weight and a synchronization number of the synchronization message when determining to update the first local time.

8. The node synchronization method of claim 1, wherein when the first synchronization node is a friend node, the node synchronization method further comprises:
   generating and forwarding the synchronization message, according to the current first local time, to a low-power node by the first synchronization node after the corresponding low-power node exits from a low-power mode.

9. The node synchronization method of claim 1, further comprising:
   periodically generating the synchronization message by the first synchronization node when the first synchronization node does not receive the synchronization message for more than a preset period; and
   periodically broadcasting the synchronization message by the first synchronization node.

10. The node synchronization method of claim 9, wherein the step of generating the synchronization message by the first synchronization node comprises:
    initializing a first local weight of the first synchronization node by the first synchronization node;
    initializing a first local number of the first synchronization node by the first synchronization node; and
    generating the synchronization message according to the first local time of the first synchronization node, the initialized first local weight, and the initialized first local number, wherein the synchronization time of the synchronization message is the first local time, a synchronization weight of the synchronization message is the initialized first local weight, and a synchronization number of the synchronization message is the initialized first local number.

11. A network, comprising:
a first synchronization node, having a first local time, configured to receive a synchronization message and determine whether to update the first local time when receiving the synchronization message;
wherein the synchronization message comprises a synchronization time; and
wherein when determining to update the first local time, the first synchronization node updates the first local time according to the synchronization time, updates the synchronization time of the received synchronization message with the current first local time, and forwards the updated synchronization message.

12. The network of claim 11, further comprising:
a second synchronization node, configured to broadcast the synchronization message when a synchronization condition is reached.

13. The network of claim 12, wherein the synchronization condition is that every time a predetermined synchronization period is reached or an unsynchronized node joins the network.

14. The network of claim 12, wherein the second synchronization node has a second local time and the second synchronization node stores a second local weight and a second local number; wherein the synchronization time of the synchronization message is the second local time of the second synchronization node when generating the synchronization message, a synchronization weight of the synchronization message is the second local weight, and a synchronization number of the synchronization message is the second local number; wherein the second local weight is greater than a first local weight of the first synchronization node; wherein the second local number is increased with the number of times that the second synchronization node generates the synchronization message; and wherein the first synchronization node determines whether to update the first local time according to the synchronization weight of the synchronization message and the first local weight.

15. The network of claim 11, wherein the first synchronization node further stores a first local weight, the synchronization message further comprises a synchronization weight, and the first synchronization node further compares the synchronization weight with the first local weight to determine whether to update the first local time; and wherein when the synchronization weight is greater than the first local weight, the first synchronization node determines to update the first local time, and when the synchronization weight is smaller than the first local weight, the first synchronization node determines not to update the first local time.

16. The network of claim 15, wherein the first synchronization node further stores a first local number, and the synchronization message further comprises a synchronization number; wherein when the synchronization weight is equal to the first local weight, the first synchronization node compares the synchronization number with the first local number; wherein when the synchronization number is greater than the first local number, the first synchronization node determines to update the first local time; and wherein when the synchronization number is smaller than or equal to the first local number, the first synchronization node determines not to update the first local time.

17. The network of claim 11, wherein the first synchronization node further stores a first local weight and a first local number, and the synchronization message further comprises a synchronization weight and a synchronization number; and wherein when determining to update the first local time, the first synchronization node further respectively updates the first local weight and the first local number according to the synchronization weight and the synchronization number.

18. The network of claim 11, wherein when the first synchronization node is a friend node, the first synchronization node generates and forwards the synchronization message, according to the current first local time, to a low-power node after the corresponding low-power node exits from a low-power mode.

19. The network of claim 11, wherein when the first synchronization node does not receive the synchronization message for more than a preset period, the first synchronization node periodically generates the synchronization message and periodically broadcasts the synchronization message.

20. The network of claim 19, wherein the first synchronization node stores a first local weight and a first local number; wherein when the first synchronization node does not receive the synchronization message for more than the preset period, the first synchronization node initializes the first local weight and the first local number, and the first synchronization node generates the synchronization message according to the first local time, the initialized first local weight and the initialized first local number; and wherein the synchronization time of the synchronization message is the first local time, a synchronization weight of the synchronization message is the initialized first local weight, and a synchronization number of the synchronization message is the initialized first local number.

* * * * *